United States Patent

[11] 3,603,064

| [72] | Inventor | Jesse R. Pinkham<br>Winston-Salem, N.C. |
|---|---|---|
| [21] | Appl. No. | 825,625 |
| [22] | Filed | May 19, 1969 |
| [45] | Patented | Sept. 7, 1971 |
| [73] | Assignee | R. J. Reynolds Tobacco Company<br>Winston-Salem, N.C. |

[54] METHOD AND APPARATUS FOR HARVESTING TOBACCO
28 Claims, 21 Drawing Figs.

| [52] | U.S. Cl. | 56/27.5 |
| [51] | Int. Cl. | A01d 45/16 |
| [50] | Field of Search | 56/27.5, 330, 19, 327 |

[56] References Cited
UNITED STATES PATENTS

| 2,635,408 | 4/1953 | Cox | 56/27.5 |
| 2,643,754 | 6/1953 | Doak | 56/328 X |
| 2,876,610 | 3/1959 | West et al. | 56/27.5 |
| 3,393,501 | 7/1968 | Meyer | 56/27.5 X |
| 3,466,856 | 9/1969 | Rakestraw | 56/27.5 |

*Primary Examiner*—Russell R. Kinsey
*Attorneys*—Robert S. Dunham, P. E. Henninger, Lester W. Clark, Thomas F. Moran, Gerald W. Griffin, R. Bradlee Boal, Christopher C. Dunham and Robert Scobey

ABSTRACT: Method and apparatus for defoliating selected sections of tobacco plants comprising forming a frame at least partially surrounding the stalk of the plant at a predetermined upper level and moving the frame downwardly of the stalk to a predetermined lower level, thereby engaging and removing leaves projecting from the stalk between those two levels. The frame is formed by two opposed endless bands running over guide wheels rotating about substantially vertical axes and carried along the row of tobacco plants by a vehicle arranged to straddle a row of such plants. The backward speed of the endless belts with respect to the vehicle on the reach adjacent the stalks of the plants is made substantially equal to the forward speed of the vehicle. Each endless belt carries a series of spaced fingers projecting toward the other band. The projecting fingers on the opposed bands cooperate with the other parts of the bands to define the frames for stripping the leaves from the tobacco stalk.

INVENTOR.
JESSE R. PINKHAM
BY Lester W. Clark
ATTORNEY

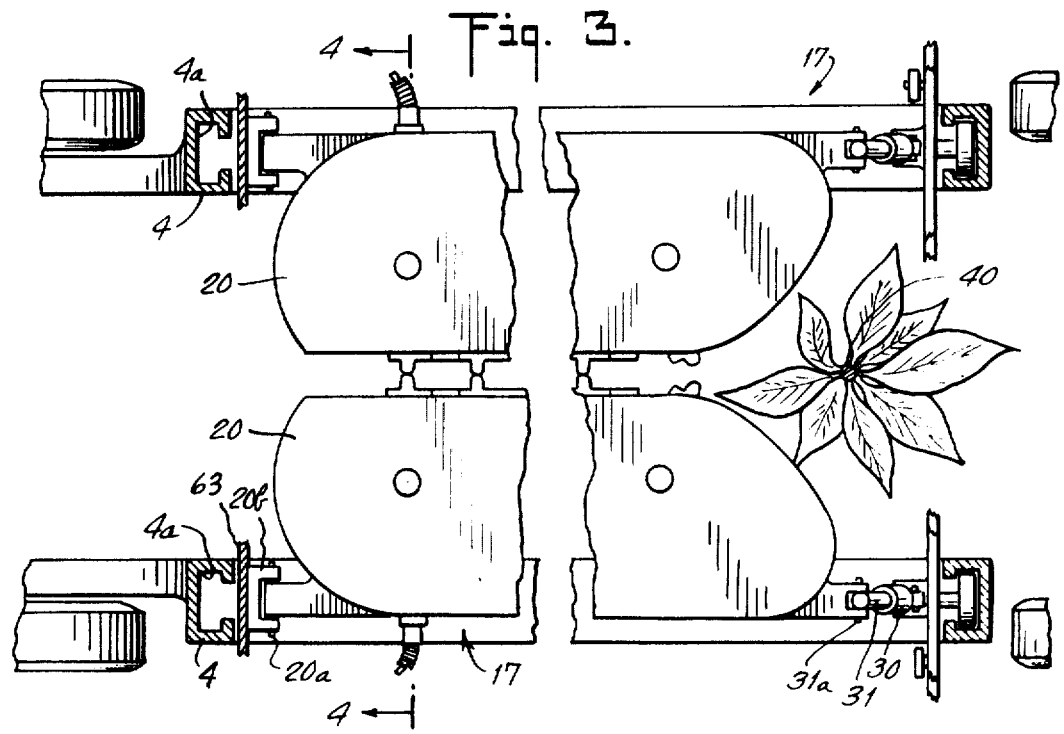
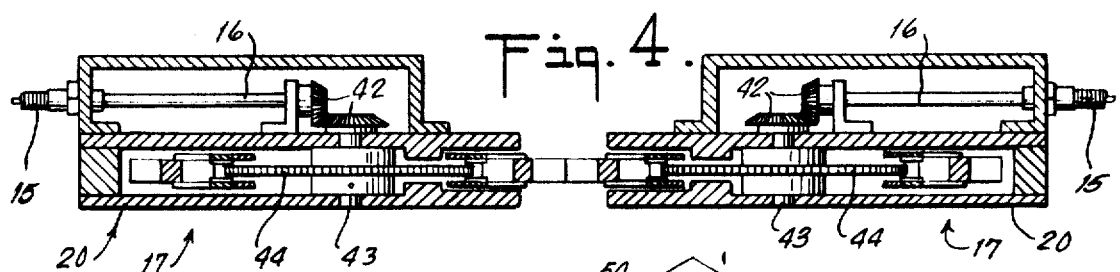
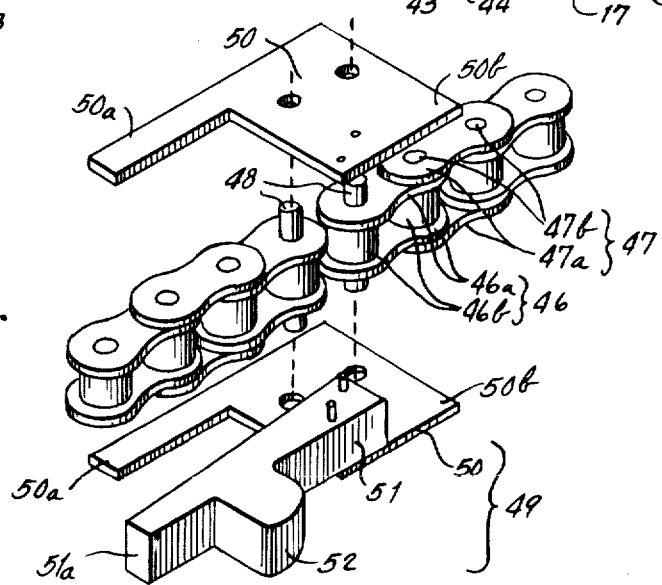

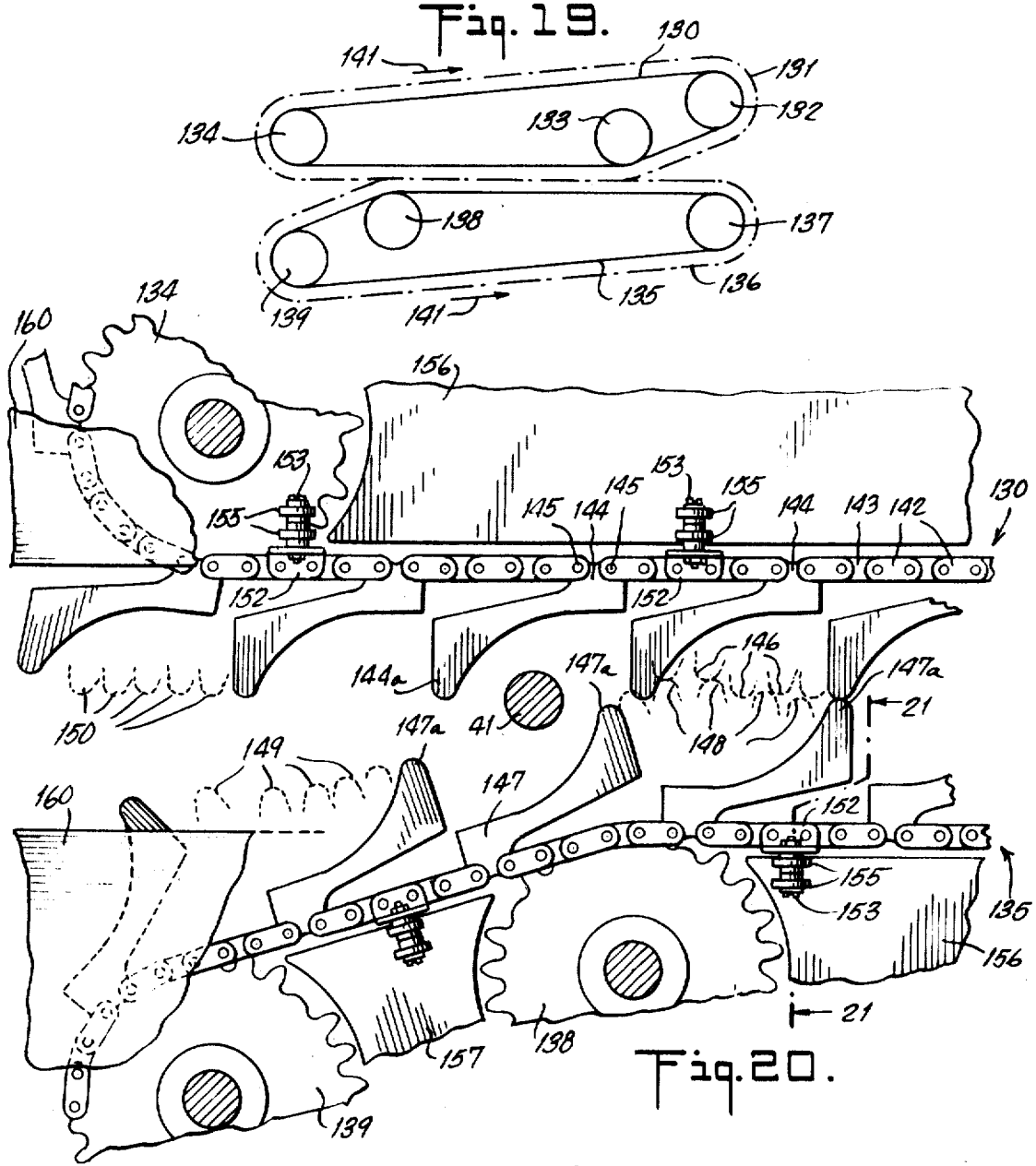
Fig. 19.
Fig. 20.
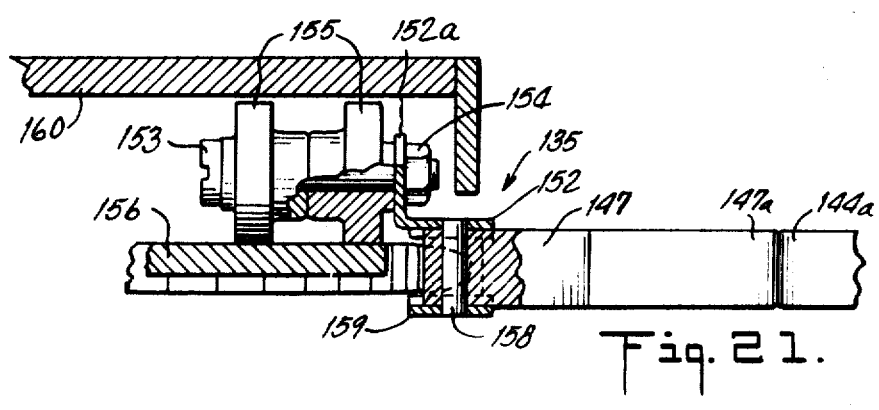
Fig. 21.

METHOD AND APPARATUS FOR HARVESTING TOBACCO

BACKGROUND OF THE INVENTION

Tobacco-harvesting devices have been constructed, which comprise a vehicle adapted to straddle one or more rows of tobacco plants and carrying, for each row of plants, a pair of defoliators, one located on each side of the row of plants. The defoliators are typically rotated about an axis which slants downwardly from the horizontal toward the rear of the vehicles. The defoliator includes helical or other more or less flexible projections which engage the leaves of the tobacco plants as the defoliators rotate and strip them downwardly from the stalk. See, for example, the U.S. Pats. to Wilson, No. 2,816,411, No. 2,834,173 and No. 3,083,517. The defoliator devices in the prior art apparatus are rotated at a fairly rapid rate, so that the blades or other projections on the defoliators will be sure to engage all of the tobacco leaves. The rate of rotation is fast as compared to the motion of the apparatus along the row of tobacco plants, so that some of the stalks and unharvested leaves may be damaged by the movement of the defoliators as they pass down the row.

The bottom leaves of a tobacco plant ripen first, and the ripening progresses slowly up the plant reaching the upper leaves in a period of weeks after the lowest leaves ripen. The harvesting of tobacco leaves is therefore a repeated process of "priming" the plants, i.e., harvesting only those leaves which are ripe or "prime" at one time, and then repeating the process about once a week until all the leaves are harvested.

It is therefore desirable, on a mechanical harvester, that the defoliators operate on only a limited vertical section of the stalks and that the height of that section be controllable by the operator. It is also necessary that the defoliators be adjustable to different levels, so that the successive "primings" of the tobacco plants may be carried on at different heights.

BRIEF SUMMARY OF THE INVENTION

The present invention relates to an improved defoliator for use on a harvesting machine. Preferably, the defoliator is mounted on a vehicle adapted to straddle a row of tobacco plants and two defoliators are used, one on each side of the row of plants. Each of the two defoliators comprises an endless band, preferably a chain, running over front and rear guide wheels rotating about substantially vertical axes, and spaced apart in the direction of motion of the vehicle. The guide wheels and the defoliator bands are mounted in carriages which are shiftable laterally of the vehicle so that the inner or defoliating reaches of the endless band, which move rearwardly with respect to the vehicle, may be located close to the stalks of the tobacco plants. The endless bands are driven at a speed such that the backward speed of each band on the defoliating reach is substantially equal to the forward speed of the vehicle.

The band carries spaced fingers projecting from the band at intervals. These fingers are intended to project between the stalks of the tobacco plants so as to engage leaves growing lengthwise of the row as well as those growing crosswise. The fingers are preferably articulated so that they may yieldably swing forwardly or backwardly with respect to the frame of the vehicle, to avoid stressing the tobacco plants which they encounter. This articulation can be accomplished either by making the fingers themselves of resilient material, by mounting them on links of the chain that serves as the endless band, or by mounting them on the pivot pins of such a chain. In the latter case, suitable means may be provided to limit rotation of the fingers with respect to their mounting.

Since the fingers are moving more rapidly with respect to the stationary stalks when they pass around the guide wheels, than they are along the defoliating reach of the band, means may be provided to slow the movement of the fingers as they approach the defoliating reach of the endless band, so that the tobacco leaves and stalks will not be injured by abrupt motions of the fingers.

The fingers on the two opposed chains should be located so that the tip of each finger on one chain is touching, or nearly touching, a finger on the other chain, as the fingers pass along the defoliating reaches of the chains, so that the frames surrounding the tobacco stalks are substantially completely defined by the chains and fingers. To that end, the fingers on one chain may be located directly opposite the fingers on the other chain.

Alternatively, the fingers on one chain may be constructed to trail behind their respective supports on the chain, while the fingers on the other chain are constructed to lead their respective supports, so that each tip of a trailing finger cooperates with a tip of a leading finger. This latter construction has the advantage that the fingers approach the row of stalks alternately from opposite sides, and there is little chance that a stalk may be squeezed between two fingers, as is possible when fingers approach from opposite sides simultaneously.

THE DRAWINGS

FIG. 3 is a fragmentary sectional view, on the same enlarged scale as FIG. 2, taken on the line 3—3 of FIG. 1.

FIG. 4 is a sectional view, on a still further enlarged scale, taken on the line 4—4 of FIG. 3.

FIG. 5 is an exploded view showing the links in the chain of FIGS. 2-4.

FIG. 19 is a view similar to FIG. 9 showing diagrammatically a somewhat different arrangement of sprocket wheels providing gradual entry and exit sections for the defoliating reach of the chains.

FIG. 20 is a view on an enlarged scale showing the exit section of the chains of FIG. 19.

FIG. 21 is a sectional view taken on the line 21—21 of FIG. 20.

DETAILED DESCRIPTION

FIGS. 1—8

Figure 1:
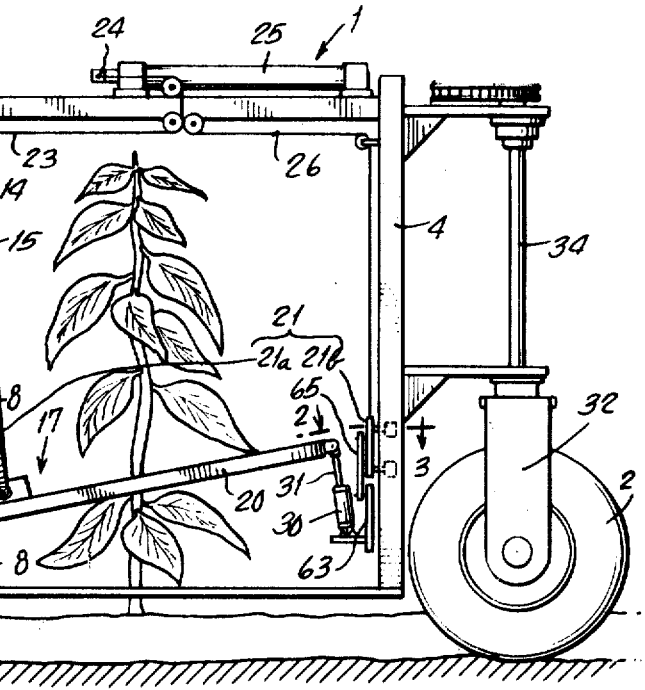
FIG. 1 is a side elevational view of a tobacco-harvesting apparatus constructed in accordance with the invention, with certain parts omitted for purposes of clearly illustrating the present invention.
Figure 6:
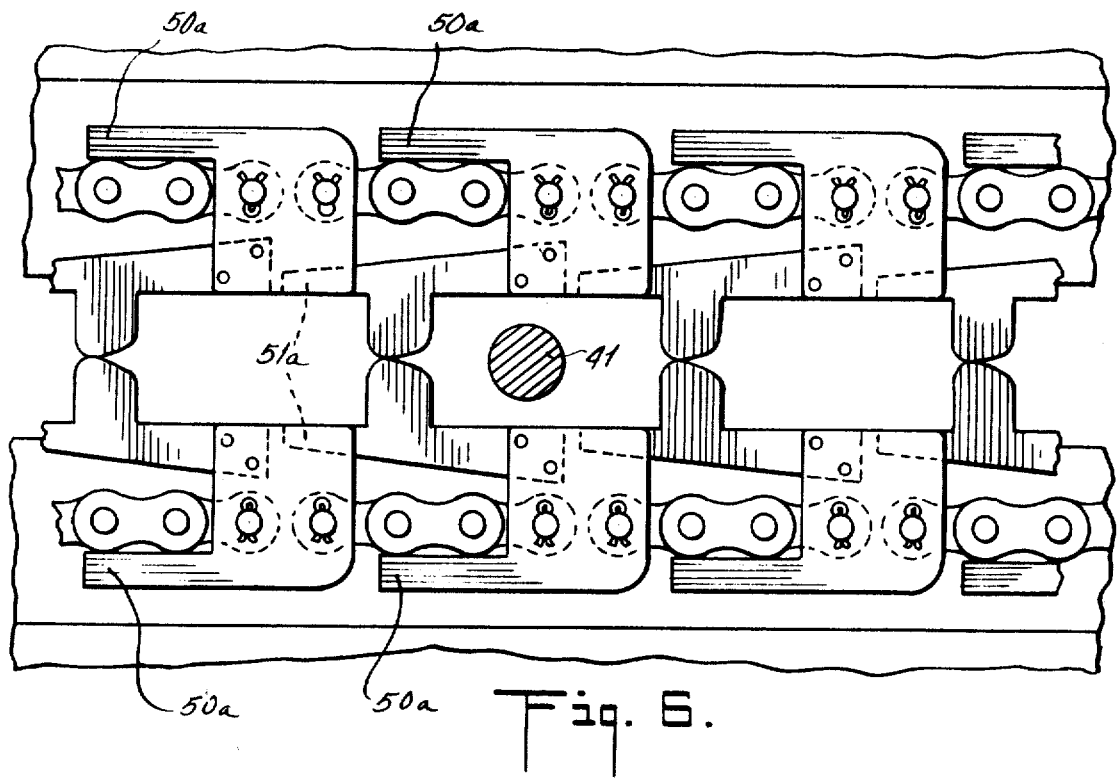
FIG. 6 is a view, on an enlarged scale, of the defoliating reaches of a pair of chains of the type shown in FIGS. 2-5.

FIG. 1 illustrates generally a vehicle 1 carrying tobacco-harvesting apparatus constructed in accordance with the invention. The vehicle has a pair of front wheels 2 and a pair of rear wheels 3 supporting a frame including left and right pairs of uprights 4, the pair of uprights on each side being connected at their upper ends to a longitudinal beam member 5. Another frame member 6 extends rearwardly from the rear upright 4 and is attached at its rear end to a downwardly extending frame member 7, which supports the rear wheel 3 at its lower end. The front and rear pairs of uprights are connected near their upper ends to front and rear transverse beam members 9. See FIG. 8. An engine 8 is mounted on the frame members and is connected by a suitable transmission generally indicated at 10 to a sprocket wheel 11 driving a belt 12 connected through another set of sprocket wheels 12a to a chain 13 and thence through a suitable sprocket wheel to the wheel 3. The transmission 10 also drives concurrently a pair of flexible transmission links 14 and 15 connected to drive shafts 16 (FIGS. 2 and 4) associated with two defoliators 17 which constitute the principal feature of novelty of the invention.

Each defoliator 17 includes a housing 20 extending longitudinally of the vehicle and connected at its rear end to a horizontal pivot pin 20a (FIG. 3), journaled in a yoke 20b fixed on a transverse beam 63. The beam 63 is supported by a pair of links 65 on the rear frame member 21a of a carriage generally indicated at 21. Each frame member 21a carries a pair of rollers 67 (FIG. 8) which are received in a suitable guide channel 4a fixed on the upright frame member 4. Carriage 21 is supported by cables 23 and 26 which run over suitable pulleys and are connected to a rod 24 operated by a hydraulic linear motor 25 or other suitable controllable power source. The motor 25 is actuated under the control of the operator to raise or lower both ends of the carriage 21 simultaneously, thereby raising or lowering the defoliator 17, together with a leaf-catching mechanism, described below.

As best seen in FIG. 1, another hydraulic linear motor 30 has one end pivotally mounted on the carriage 27, and drives a rod 31 connected by a horizontal pivot pin 31a to the forward end of the defoliator housing 20. The motor 30 may be actuated by suitable controls to raise and lower the front end of the defoliator 17 with respect to the back end thereof.

The front wheel 2 is journaled in a yoke 32 whose upper end is fixed on the lower end of a shaft 34, which may be operated by suitable controls for steering the vehicle. The operator of the vehicle sits in a seat 35 located at the rear of the machine at a location as low as is conveniently possible with respect to the wheels. The seat is located at this low position so that the operator can accurately view the height at which the defoliator 17 is set by the hydraulic motor 25 and the angle at which it is tilted by the hydraulic motor 30.

FIGS. 2—7

Figure 2:
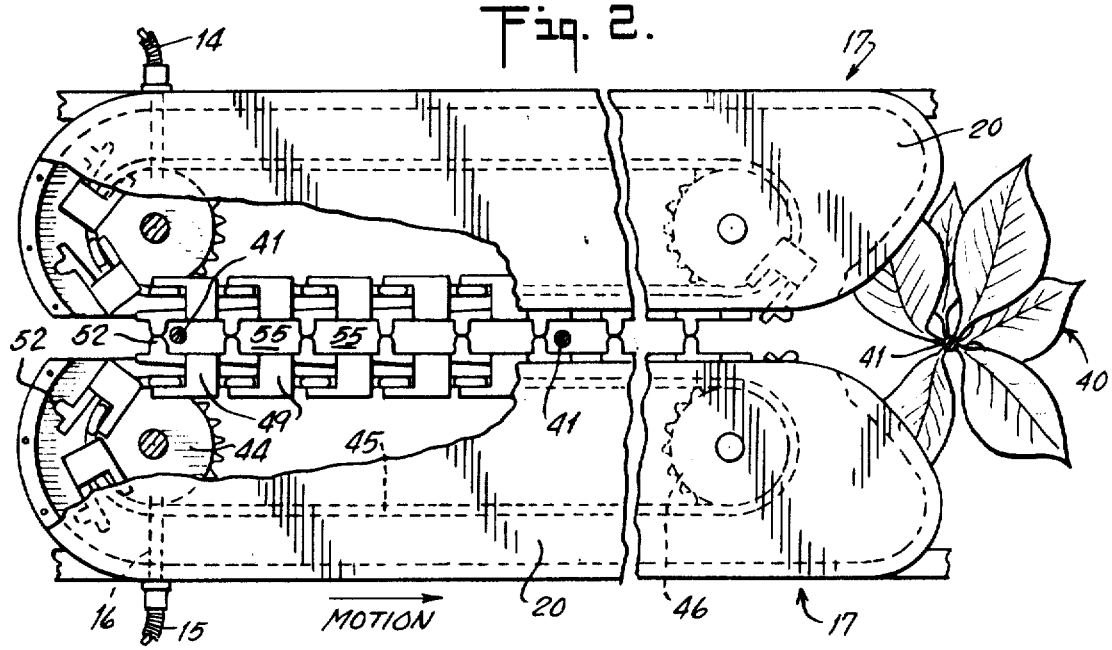
FIG. 2 is a fragmentary sectional view, on an enlarged scale, taken on the line 2—2 of FIG. 1.

Two complete defoliators 17 are shown in FIG. 2. As there shown, the two defoliators 17 are locate horizontally opposite one another, on opposite sides of a row of tobacco plants, one of which is shown at 40, with other tobacco stalks in the same row shown at 41. Each defoliator 17 includes a housing 20. The drive shaft 16 is connected through bevel gears 42 to a shaft 43 carrying a sprocket wheel 44 located at the rear of the housing 20. An endless chain 45 runs over the sprocket wheel 44 and a companion idler sprocket wheel 46 located near the front end of the housing 20. The chain 45 is illustrated in detail in FIG. 5. Most of its links are conventional roller chain links suitable for cooperation with a sprocket wheel, being alternate inner links 46 and outer links 47. Each conventional inner link 46 comprises a pair of end plates 46a connected to their ends by a pair of sleeves 46b. Each conventional outer link similarly consists of a pair of end plates 47a connected at their ends by a pair of pivot pins 47b, which pivot pins extend through the sleeves of the adjacent inner links.

In the defoliator chain constructed as shown in FIG. 5, one of the conventional outer links is replaced by a defoliator link 49 comprising a pair of plates 50 connected by pivot pins 48 which extend through the sleeves of the adjacent inner links 46. The plates 50 are wider transverse to the direction of motion of the chain, than the end plates 47a of the conventional outer links 47. Each plate 50 has a rearwardly extending projection 50a on its side adjacent the sprocket wheel. The projections 50a extend rearwardly for a distance greater than the length of two links so that they are aligned with the end plates 47a of the next outer link 47 in the chain. The plates 50 also project beyond the links 46 and 47 in the direction toward the tobacco stalks, as shown at 50b, and these projecting sides are connected by a bridging member 51 carrying a finger 52. Each bridging member 51 has an extending end 51a which overlaps and slides freely between the plates 50 of the next defoliating link to the rear. The projecting ends 51a cooperate with the plates 50 to keep the defoliating links substantially in alignment.

The projecting ends 50a are effective when the chains are passing around the sprocket wheels, to pull the fingers 52 away from the tobacco stalks more rapidly than would otherwise be the case. See the links at the left-hand side of FIG. 2, and note that the link 49 which is just entering the sprocket wheel is about to be tilted to carry its finger 52 away from the row of tobacco stalks, and that this tilting takes place before the link 49 itself engages the sprocket wheel 44. In the arrangement shown in FIGS. 2-7, the fingers 52 on the opposed chains are aligned with each other.

The chains 45 are driven at a linear speed substantially equal to the forward speed of the vehicle carrying the defoliators. This may be readily accomplished, since both the drive wheels 3 and the chains 45 are driven from the transmission 10, and it is only necessary to design the motion-transmitting links between the transmission 10 and the wheels 3, on the one hand and the links between that shaft and the sprocket wheels 44 on the other hand, so as to produce equal rates of linear speeds at the periphery of the wheels 3 and at the periphery of the sprocket wheels 44.

It should be noted that sprocket wheels 44 must both be driven from the same source of motion, so that the fingers 52 on the two chains remain in alignment. A differential is provided in the shaft which drives the sprocket wheels 11. The sprocket wheels 44 may be driven from the input side of the differential, as shown, or both may be driven from the same output side, so that the fingers will not get out of step when the vehicle turns a corner.

Figure 7:
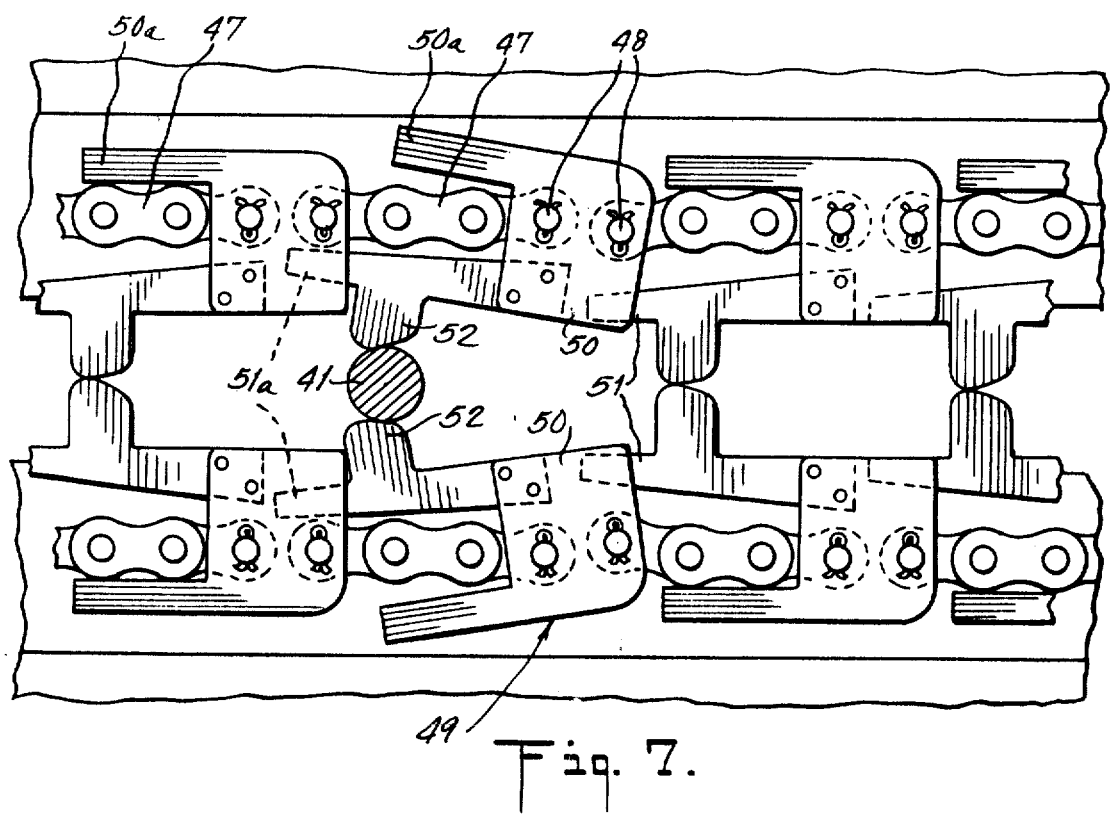
FIG. 7 is a view similar to FIG. 6, but showing the tilting of the links when two opposed fingers engage a tobacco stalk.

Thus, on the inner or defoliating reach of the chains 45, adjacent the tobacco stalks, the chains 45 are moving backwardly at the same speed that the vehicle carrying them is moving forwardly. Thus, the defoliating links 49 and their projecting fingers 52 together form a series of frames 55, one of which surrounds each tobacco stalk in the row. The front ends of the housings 20 are tapered, so as to guide any laterally leaning tobacco stalk into the path between the two chains 45. The ends of the fingers 52 are rounded, so that they will not damage a tobacco stalk even though they engage it at diametrically opposite points, as illustrated in FIG. 7. Furthermore, the rounded contour of the fingers 52 allows such a stalk to slip away from the position between the lugs. The pivotal mounting of defoliating links 49 allows them to deflect away from any stalk which is directly engaged by the ends of the fingers 52, as shown in FIG. 7, Thereby further diminishing the possibility of damage to the tobacco stalks by the fingers 52.

The fingers 52 are substantially offset from the midpoint of the line between the centers of the pins 48. Consequently, the tobacco stalks 41 which are engaged by the fingers 52 have a substantial mechanical advantage by which to apply a tilting action to the finger carrying link 49, to move them to a position such as that shown in FIG. 7.

When the front ends of the defoliators 17 are raised with respect to the rear ends, as shown in FIG. 1, the frames encircling the tobacco stalks do not move horizontally with respect to the stalks, but move only vertically. Thus, as the vehicle passes a stalk, one of the frames surrounds the stalk and then moves downwardly along a predetermined section of the stalk selected by the machine operator. As it moves downwardly, it engages and strips from the stalk any leaves which are growing in that section. The operator selects the tilt of the defoliators so as to harvest all the prime leaves. The height of the defoliators from the ground is adjustable to enable him to select a particular section of the stalks which he wants to defoliate.

Figure 8:
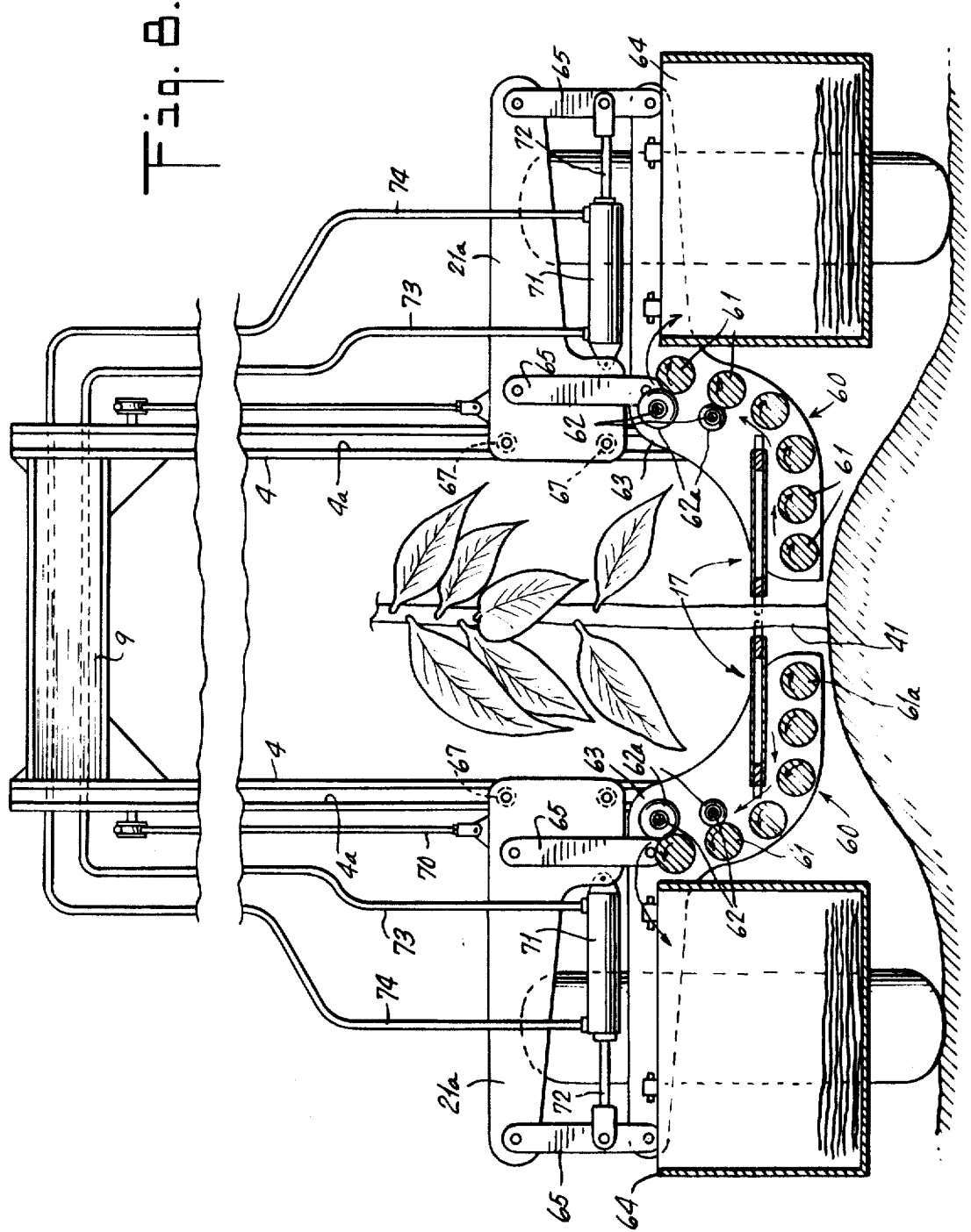
FIG. 8 is a fragmentary transverse view of the apparatus of FIG. 1, with certain parts omitted for clarity, and taken on the line 8—8 of that figure.

FIG. 8 shows somewhat diagrammatically, with many parts omitted for the sake of clarity, the mechanism for collecting the leaves which are harvested by the defoliators 17.

Under the defoliators 17, the beams 63 carry a pair of collector baskets 60 including a plurality of rollers 61 journaled in the beams 63 and continuously driven by suitable chains or other mechanism in a direction to move any leaves falling on them in the outward direction away from the row of stalks.

All of the rollers 61 in one collector basket, such as the one appearing at the right in FIG. 8, turn in the direction shown by the arrows, so as to move any harvested leaf outwardly, away from the row of stalks. All of the rollers 61 in the other collector basket, turn in the opposite direction, except the roller 61a nearest the central gap between the two baskets. That roller turns clockwise, i.e., in the same direction as the rollers in the right-hand basket, so that a harvested leaf bridging the gap is always driven to one side, rather than being allowed to rest precariously on two rollers acting in opposite directions.

The two outermost rollers 61 on each side have cooperating with them a set of idler rollers 62 covered with rubber tires 62a or other suitable friction surfaces so as to grip the tobacco leaves as they move along the outer rollers 61 and drive them upwardly and over the edge of the basket 60 into a collector box 64. The entire mechanism on each side, including the basket 60, the collector box 64 and defoliator 17 is supported on the vertical links 65 whose upper ends are pivoted on the horizontally extending carriage 21a whose rollers 67 ride in the vertical guide channel 4a. Each of a pair of hydraulic cylinders 71 has one end pivoted to the carriage 21a on one side of the vehicle and drives a piston rod 72 pivotally connected to a link 65. The inner ends of the cylinders 71 on opposite sides of the vehicle are connected by a conduit 73. The outer ends of the cylinders 71 on opposite sides of the vehicle are connected by a conduit 74. Thus, as one of the carriages 21a swings on its links 65 under the influence of contact with the tobacco stalks, being moved, for example, to the right as shown in FIG. 8, the hydraulic cylinders 71 and their connections are effective to move the carriage 21 a and their associated parts on the opposite side of the vehicle in the same direction, so that the space between the left-hand inside roller 61a and the tobacco stalk is taken up and the space between the inside rollers 61 and 61a is maintained at a minimum.

Instead of using chains, defoliating fingers and links as described above, it would be possible to use a belt having integral projecting lugs formed on its surface. The word "band" as used in this specification is intended to be generic to a chain and to a belt.

The defoliating fingers or lugs on the chain or belt may take various forms as described below.

As the angle of tilt of the defoliators is changed, the horizontal component of the speed of the defoliating chains is varied slightly. This variation may be compensated by the introduction of suitable gearing in the mechanism for driving the chain. However, the introduction of such compensating gearing results in considerable complication of the driving mechanism. It has been found quite satisfactory to design the gearing so that the horizontal component of the speed of the chain in the backward direction along the defoliating reach exactly equals the forward speed of the vehicle when the tilt of the defoliators is set in the middle of its range. If that is done, then an increase in the tilt of the defoliators to their maximum angle of tilt decreases with the horizontal component of the chain speed so that the chains do not move backwardly quite as fast as the vehicle moved forward over the ground. Thus, the chains under those circumstances would tend to move forward slightly with respect to the tobacco stalks. However, since the reach of the chains is only about three or four feet, this only means a difference of an inch or two at the most with respect to any tobacco stalk. Tobacco stalks are sufficiently flexible to allow that much motion without any deleterious effect. When the defoliators are set to the minimum angle of tilt, the chains would run faster than the vehicle and would tend to bend the stalks backward. Again, the stalks are sufficiently flexible so that they are able to withstand this treatment.

Instead of an exactly compensating gearing, which would be quite complex, a gearshift could be provided to approximate the correct speed where a wider than normal swath is desired. Alternatively, provision might be made to change sprocket wheels in the drive train whenever such a wide swath was needed, as during the final uppermost priming operation.

Since the linear speed of the belts 45 with respect to the vehicle carrying them is substantially equal to the linear speed of that vehicle over the ground, it will be readily understood that the defoliating reach of the chains, as they travel from the sprocket wheel 46 to the sprocket wheel 44 moves substantially at zero speed with respect to the ground, while the return reach of the chains, i.e., from the sprocket wheel 44 to the sprocket wheel 46 moves at substantially twice the vehicle speed with respect to the ground. As a link of the chain passes around the forward sprocket wheel 46, it decelerates from a maximum speed with respect to the ground at the point where it first engages the sprocket wheel 46 to zero speed at the point where it leaves the sprocket wheel 46. Thus, as the links approach their point of entry into the defoliating reach, they have a small and diminishing component of forward motion with respect to the ground. Furthermore, as they leave the defoliating reach, they have a small but increasing component of forward motion with respect to the ground.

FIGS. 9–11

These figures illustrate a modified form of chain 80 which may be used in place of the chains 45 of FIGS. 1–8. The chains 80 have most of their links conventional, being alternating inner links 81 and outer links 82, and adapted to engage and move over sprocket wheels 83 and 84, which are more widely spaced apart than the sprocket wheels 44 and 46 of FIG. 2. Certain of the outer links are not conventional, however, but are finger carrying links as shown at 85, being a single integral piece of resilient material, such as stiffly flexible rubber, and having a pair of flanges 85a adapted to be attached by pivot pins 85b to the next adjacent inner links 81. The links 85 project forwardly of the direction of motion of the vehicle from their point of attachment to the chains 80, and carry at their forward ends a lateral projecting finger 86. The fingers 86 are located opposite each other on opposite sides of the vehicle.

Figure 9:
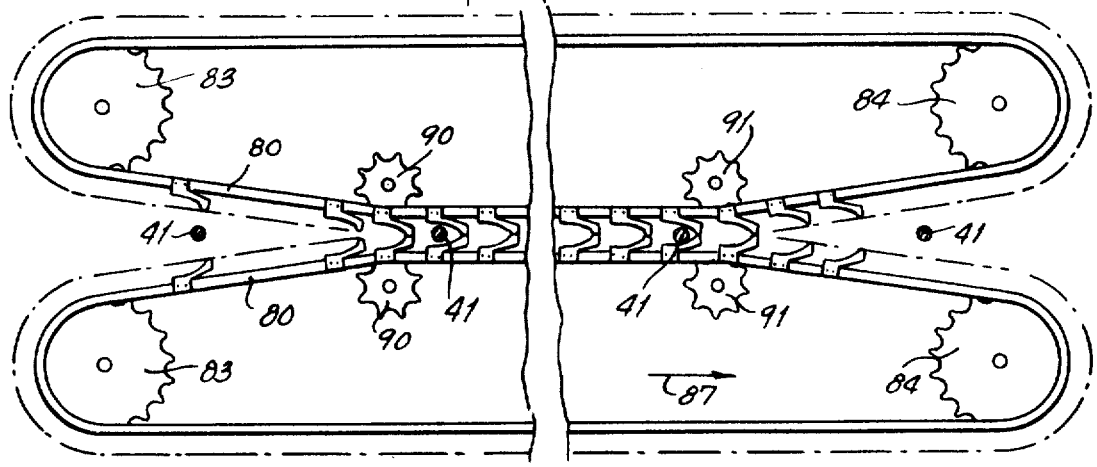
FIG. 9 is a view similar to FIG. 2, illustrating a modification.
Figure 10:
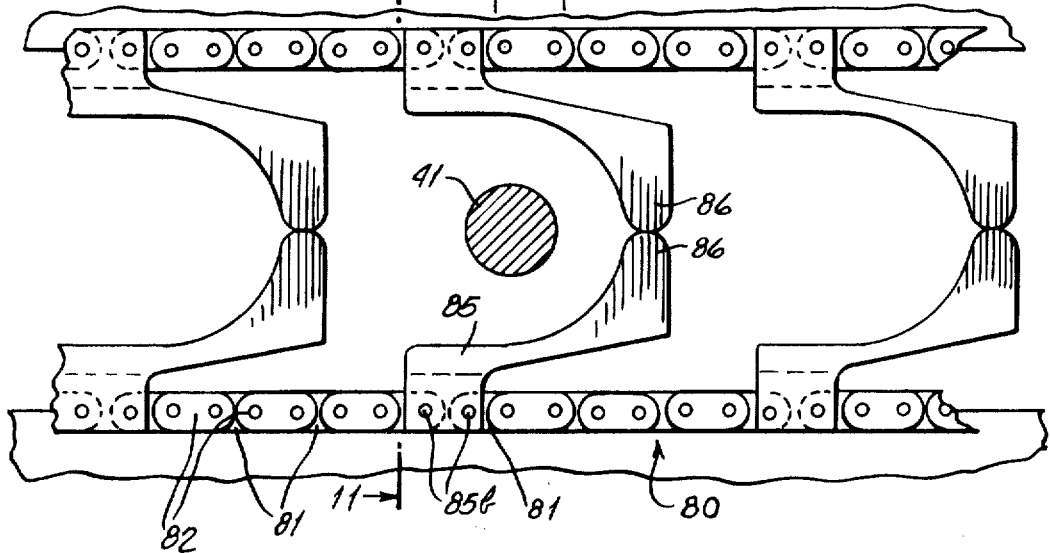
FIG. 10 is an expanded view, similar to FIG. 6, but illustrating the modification of FIG. 9.
Figure 11:
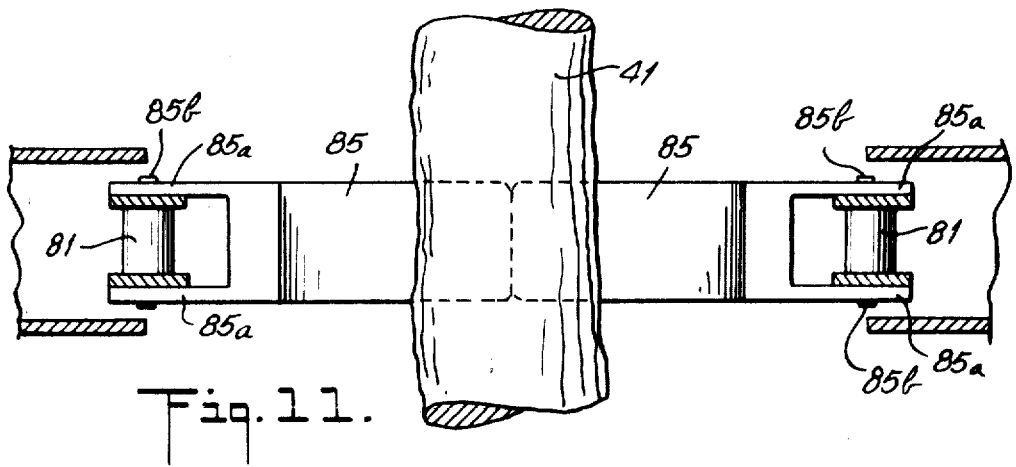
FIG. 11 is a cross-sectional view taken on the line 11—11 of FIG. 10.

The vehicle in FIG. 9 is assumed to be moving forward from left to right, as shown by the arrow 87 in the drawing.

For each of the defoliating chains there is provided an additional pair of sprocket wheels 90 and 91 closely spaced on opposite sides of the row of tobacco stalks. The distance of separation between the sprocket wheels 90 and 91 on the opposite sides of the row of tobacco stalks are substantially less than the separation distance between the main sprocket wheels 83 and 84, being about the same as the separation distances between the sprocket wheels 44 and 46 of FIG. 2. Thus, the inner reach of each chain 80 comprises an entrance section between the sprocket wheel 84 and the sprocket wheel 91, the defoliating reach itself, between sprocket wheels 91 and 90, and an exit section between sprocket wheels 90 and 83. In the entrance and exit sections, the fingers 86 are moving horizontally with respect to the tobacco stalks at a low rate of speed, even though they are stationary with respect to the tobacco stalks in the defoliating reach itself. This provision of entrance and exit sections for the inner reaches of the chains 80 allows the fingers 86 to move slowly into and out of engagement with the tobacco stalks rather than to engage and disengage the tobacco stalks at a time when they are rapidly decelerating or accelerating during passage around a sprocket wheel, as in the modification illustrated in FIGS. 1–8.

FIG. 12

This figure illustrates a chain and finger construction in which the defoliating links 95 are provided with arcuate slots 95a which engage the ends of the pivot pins 85b connecting the defoliating links to the next forwardly adjacent inner link. The slots 95a allow the links 95 to pivot around the other pivot pin 85c, which engages holes in the link 95 instead of slots, thereby reducing the pressure between the tips of fingers 86, which otherwise might be increased at the point when the links 95 start to travel around the rear sprocket wheels 83.

If desired, springs 96 may be provided on each of the links 95 to bias them to their projecting positions, so that they will not fall away from the stalks of tobacco because of the presence of the slots 95a.

FIG. 13

Figure 12:
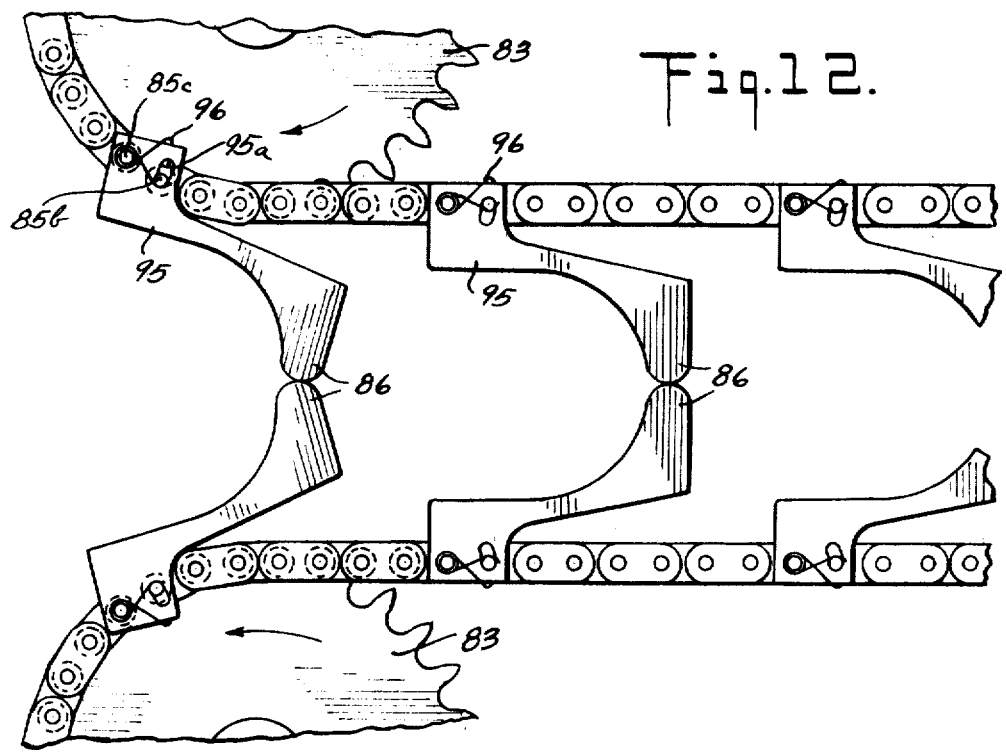
FIG. 12 is a view similar to FIG. 10, illustrating a further modification.
Figure 13:
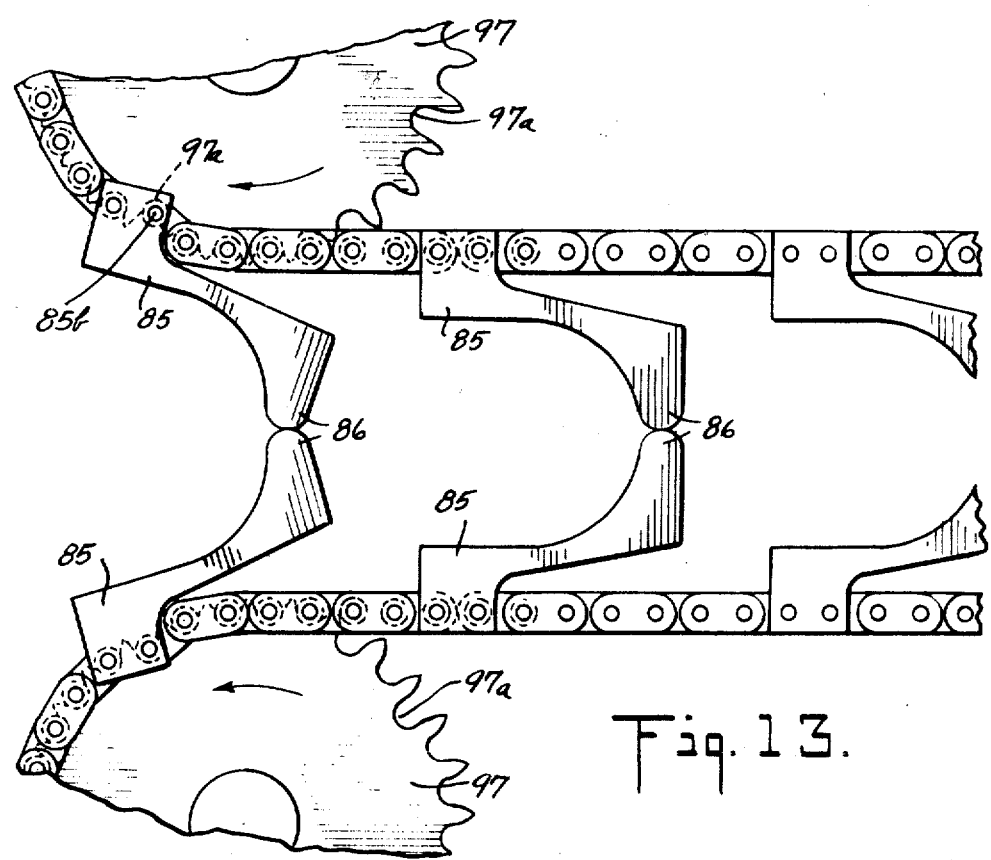
FIG. 13 is a view similar to FIG. 10, illustrating still another modification.

This figure illustrates another modification in which means is provided for allowing the finger carrying links 85 to pivot in a retracting direction as they start around the periphery of the sprocket wheels. In this modification, the sprocket wheel 83 of FIG. 12 is replaced by a modified sprocket wheel 97 having deep recesses 97a between certain of its teeth to receive the forward pivot pins 85b on each finger carrying link 86. The deep valleys 97a between the teeth of the sprocket wheel permit the pivoting of the links 85, thereby easing pressure between the tips of fingers 86 when the links 85 start around the sprocket wheels 97.

FIG. 14

Figure 14:
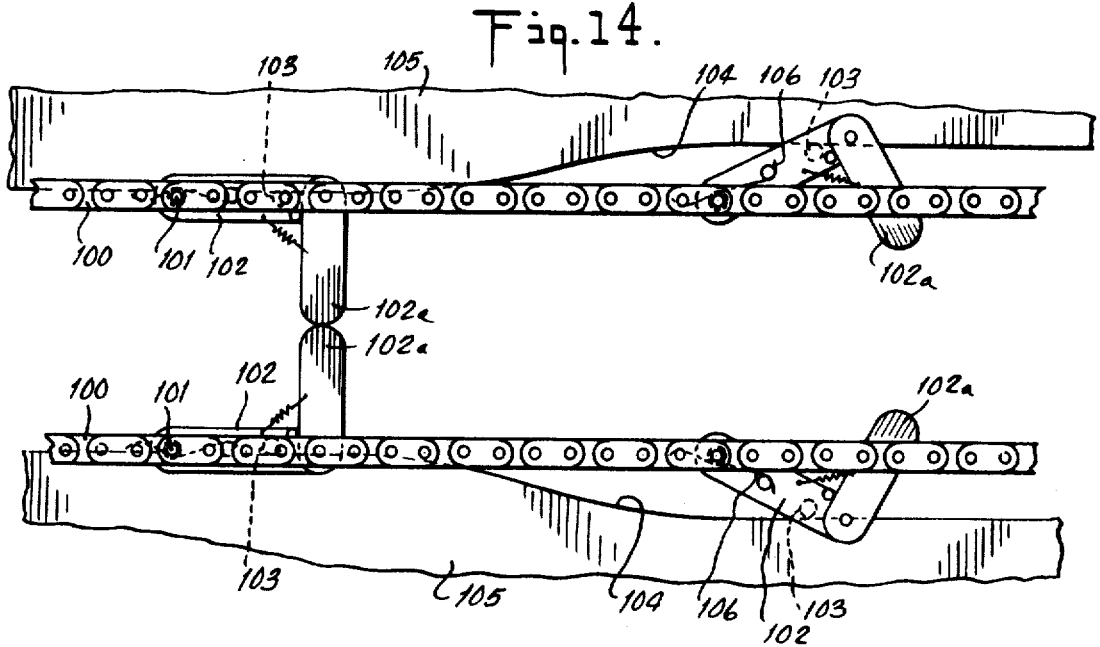
FIG. 14 is a fragmentary view similar to a portion of FIG. 9, illustrating another finger arrangement.

This figure illustrates another modified chain structure, in which all of the links of the chain 100 are conventional, except that certain of the links are provided with pivot pins 101 which project beyond the end of the links and carry L-shaped arms 102 terminating in fingers 102a. Each arm 102 carries a pin 103 which rides against a cam track 104 fixed on the cover 105 for the chain. The cam track is contoured so that the fingers 102a are retracted at least during their movement around the forward sprocket wheel and are subsequently moved forward to their active, stalk-engaging position, as they appear at the left-hand side of FIG. 14, by suitable curves in the cam track 104 at a convenient location where the arms 102 are not traveling forwardly with respect to the vehicle. Springs 106 bias the arms 102 toward their retracted position.

FIGS. 15–16

These figures illustrate a modified form of chain 110, in which there are spaced along the length of each chain, on selected pivot pins 111, a plurality of star wheels 112. In the illustrated modification, each star wheel has four teeth 112a and is fixed to a cam 113 which cooperates with a roller 114 biased by a spring 115 into engagement with the cam. The contours of the cams 113 are designed so that the star wheels 112 may take up only four stable positions, corresponding to the four valleys on the cam. In each of the four stable positions, the star wheels on the opposite chain cooperate with the chains to define generally triangle frames which surround each tobacco stalk 41 being defoliated.

Figure 16:
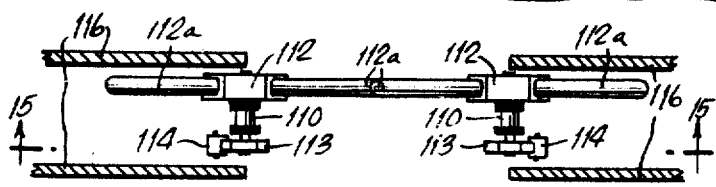
FIG. 16 is a sectional view taken on the line 16—16 of FIG. 15.

The springs 115 are leaf springs, and are shown as being attached to the end plates of the outer links 117 located rearwardly from the pivot pins 111 which carry the star wheels. As shown in FIG. 16, the cams 113 and rollers 114 are carried on one end of the pivot pins 111, while the star wheels 112 are carried on the opposite ends of those pivot pins.

FIG. 17

Figure 15:
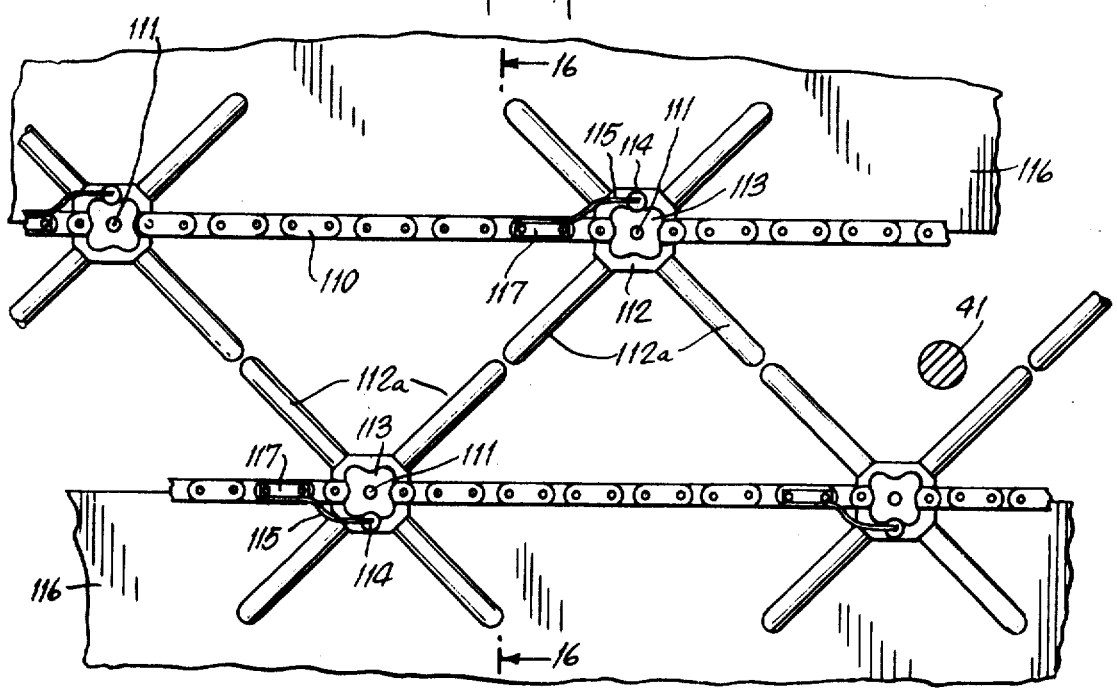
FIG. 15 is a view similar to FIG. 6, illustrating another modified form of finger structure.

This figure illustrates a modified form of defoliator chain construction, in which the lower chain, as it appears in the drawings, is constructed exactly the same as the chain 80 of FIG. 15. The upper chain 120 is similarly constructed, except that the defoliating fingers 121 mounted on the chain 120 have their tips extending forwardly of the direction of motion of that chain, so that the tips lead the chain. On the other hand, on the chain 80, the tips 86 are located toward the rear of the direction of motion of the chain with respect to the point on the chain where they are supported. In other words, the tips 86 trail the motion of the chain. Each tip 86 engages a tip 122 on the opposite chain as the fingers pass down the defoliating reaches of the two chains. As the chain 80 enters the defoliating reach, the finger tips 86 come into the defoliating positions before the link of chain 80 in alignment with the tip finishes its passage around the sprocket wheel. On the other hand, on chain 120, the defoliating tip 122 comes into its defoliating position after the link on the chain in alignment with the tip completes its travel around the sprocket wheel. The result is that the teeth 86 and 122 move into their defoliating positions alternately, rather than simultaneously, so that it is not possible for the tobacco stalks 41 to be engaged by two opposed tips at a time when both of those tips are moving horizontally with respect to the stalks. Consequently, a stalk 41 engaged by one of the tips tends to slide off that tip in one direction or the other, so that the possibility of pinching a stalk between the two tips becomes remote.

FIG. 18

This figure illustrates a modified form of chain construction including two chains 130, each generally similar to that in FIG. 15. The defoliating fingers again take the form of star wheels, as in FIG. 15, but one finger on each star wheel has been eliminated. Thus, each star wheel 131 of FIG. 18 has four teeth or fingers 131a. The cams 113 and the cooperating rollers 114 and springs 115 of FIG. 15 have also been eliminated, and have been replaced by a plurality of coil springs 132 connected between the hubs 131d of the star wheels 131. When one of the star wheels enters the defoliating reach of its chain, it may be engaged by a tobacco stalk and deflected by that stalk through a certain angle, which cannot be greater than 90°. The springs 132 allow motion of the star wheels to prevent damaging contacts between the fingers 131a and the tobacco stalks. After a star wheel 131 which has been deflected from its normal position by a tobacco stalk passes off the defoliating reach of the chain, the springs 132 are effective to restore the star wheel 131 to its normal position. When any star wheel engages a tobacco stalk, its motion is transmitted to both of the adjacent star wheels 131, which are rotated slightly and the motion is transmitted with diminishing amplitude along the chain to other star wheels. The effect of these motions on the defoliating actions of the other star wheels is not appreciable.

Figure 17:
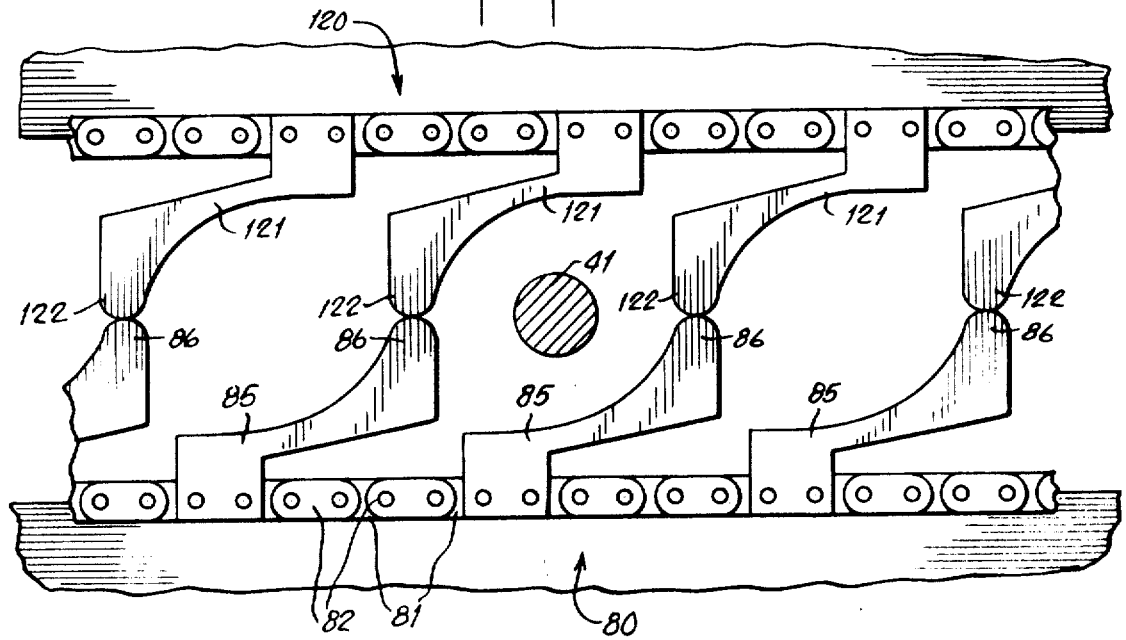
FIG. 17 is a view similar to FIG. 10, illustrating another modified chain and finger structure.
Figure 18:
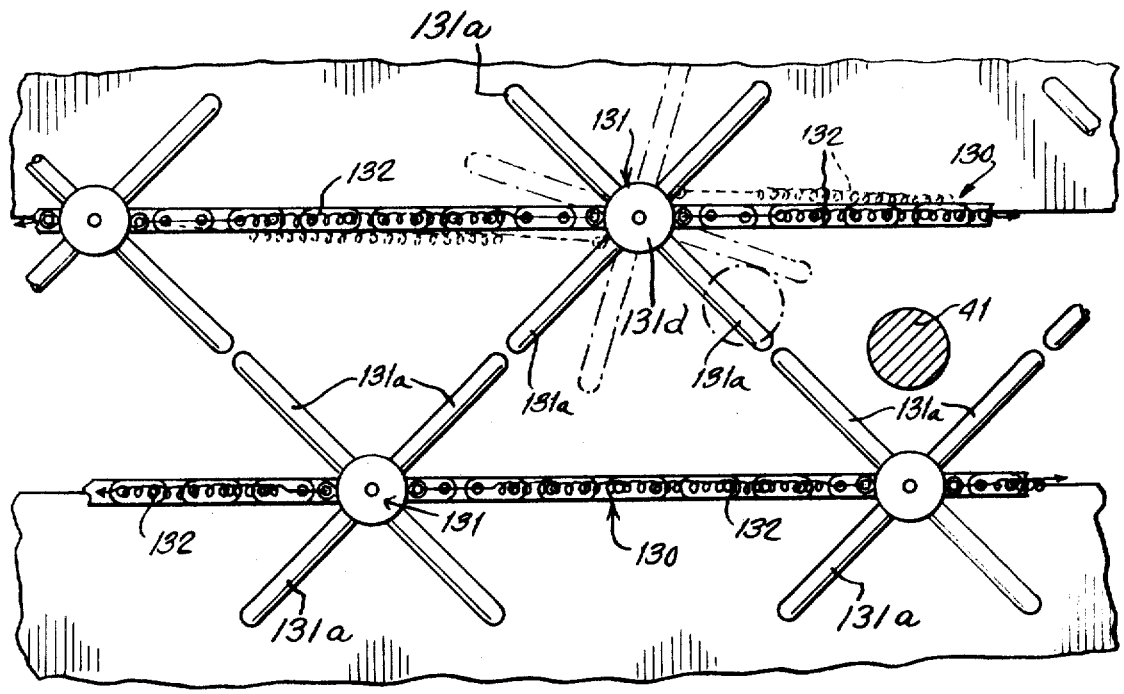
FIG. 18 is a view similar to FIG. 15, illustrating still another modified chain and finger structure.

Note that in the star wheel construction shown in FIGS. 15 and 18, each star wheel has one trailing finger 131a and one leading finger 131a, so that the cooperation of the trailing and leading fingers in the star wheel modifications of FIGS. 15 and 18 is similar to that of the trailing and leading fingers in FIG. 17.

The term "fingers" as used in this specification is intended to be generic to various finger structures illustrated including the fixed lug 52 of FIGS. 1–7, pivoted members such as the teeth 112a of the star wheels 112 in FIG. 15, or resilient members whether fixed or pivoted.

It will be apparent from the foregoing that the chains, the finger supporting links, and the fingers themselves may take any one of a wide variety of forms. It is important that the fingers on the two opposed chains cooperate with other parts of the mechanism to define frames enclosing the tobacco stalks. It is also important that the fingers be yieldably movable with respect to the vehicle on which they are mounted, so that they do not forcibly engage the tobacco stalks with resultant damage to the stalks.

FIGS. 19–21

These figures illustrate a modified arrangement of chains and sprocket wheels which provide gradual entry and exit sections for the defoliating reaches of the chains.

There are shown diagrammatically in FIG. 19 a chain 130 carrying fingers whose tips move along the path indicated by the dot-dash line 131. The chain 130 moves around a front sprocket 132, an intermediate sprocket 133 and a rear sprocket 134. Another chain 135 carries fingers whose tips move along a path indicated by the dot-dash line 136. The chain 136 moves around a front sprocket 137, an intermediate sprocket 138 and a rear sprocket 139.

As in the case of the previous chains, the outside or return reaches of the chains move forwardly as indicated by the arrows 141 at approximately twice the speed of the supporting vehicle. Those sections of the defoliating or inner reaches which are parallel to the centerline of the vehicle, i.e., the section of chain 130 between sprockets 133 and 134, and the section of chain 135 between sprockets 137 and 138, move backwardly at substantially the speed of the vehicle, so that they do not have any substantial horizontal motion with respect to any tobacco stalk being defoliated.

The chain 135 is moved rapidly into its defoliating reach, as it passes around the front sprocket 137. The front sprocket 132 of chain 130 is spaced from the defoliating reach of chain 135 by a distance greater than the length of the sprocket teeth, so that the defoliating reach of chain 130 includes an entrance section between sprockets 132 and 133 and a parallel section between sprockets 133 and 134. There is thus a gradual entrance section represented by the horizontal distance between the axis of sprockets 132 and 133, in which the fingers on the chains 130 and 135 are moving gradually together.

The defoliating reach of chain 135 includes a parallel section between sprockets 137 and 138, and an exit section between sprockets 138 and 139. Thus, at the rear ends of the chains 130 and 135 a gradual exit section begins at the intermediate sprocket 138 and extends to the rear sprocket 139 of chain 135.

As shown in greater detail in FIGS. 20 and 21, the chains 130 and 135 comprise alternate outer links 142 and inner links 143. The fingers 144 are formed integrally with certain of the inner links, and thus replace certain conventional inner links in the chain. In the construction illustrated in FIG. 20, every third inner link is replaced by a finger 144 having a supporting end apertured to receive the pivot pins 145 at the ends of the adjacent outer links, and extending forwardly from the outer links to a fingertip 144a.

The chain 135 is similarly constructed, except that the finger carrying links 147 extend rearwardly from their supporting ends to the fingertips 147a, so that the fingertips 147a trail the movement of the chain 135, whereas the fingertips 144a lead the movement of that chain.

The leading fingers 144a of chain 130 move away from their defoliating positions along a smooth tangential path as illustrated by the dotted line positions shown at 150.

The trailing fingers 147a of chain 135 do move tangentially from their defoliating positions, but rather move through a series of positions which amplifies the motion of their supporting bases 147. See the dotted line positions 148, illustrating the successive positions taken by a finger tip 147a moving from the position shown in full lines at the right-hand side of the drawing to the position of the next fingertip to the left, also shown in full lines. The line of motion of the fingertip 147a may be compared to the line of motion of the tip of the whip in the children's game of snap-the-whip. This motion of the tips 147a forces the tips 144a through a series of positions 146. The chain 130 at this point is not backed up by a sprocket, so its links are free to pivot accommodate any part of this movement which is not freely permitted by the resilience of the fingers.

As the fingers 146 start around the sprocket 139, they again move through a series of snap-the-whip positions 149. However, by this time, the tips 147a have moved along the exit section of the defoliating reach far enough so that they are no longer engaging the tobacco stalks, nor the tips 144a. Hence, at this point, no tobacco stalk is engaged both by a fingertip 147a on the lower chain 135 and by a fingertip 144a appearing in the upper chain 130. The tobacco stalk is therefore not greatly deflected from its normal position at any time, either at the beginning of the exit section or the end of the exit section.

The conditions at the entrance section of the chains are just the reverse of those at the exit sections. At the entrance section, the trailing finger tips 147a follow a smooth curve tangential to the idealized line of centers of the row of tobacco stalks, while the leading fingertips 144a perform the snap-the-whip motion as they pass around the sprockets 132 and 133. Since only one fingertip is moving toward the tobacco stalks at any one time, the tobacco stalk is free to take up a position on one side or the other of that fingertip. It should be remembered that the fingertips and the entire links which support them are preferably made of flexible material so that they will bend out of the way of a tobacco stalk and will not deliver any substantial impact or force to it. Also, as the chain 130 passes sprocket 133, the opposing links on the other chain are not backed by a sprocket and hence are free to pivot.

FIG. 21 illustrates a housing and supporting structure for the chain 135. As there shown, the finger 147 forms an inner link of the chain and is connected by a pin 158 to the end plates 152, 159 of an adjacent outer link. The upper end plate 152 is extended and bent up to form an angle bracket 152a in which is threaded a bolt 153 held in place by a nut 154. The shank of the bolt 153 serves as an axle for a pair of rollers 155 which ride on a track plate 156 between the sprockets 137 and 138. A similar track plate may be provided between the sprockets 138 and 139, as shown at 157. The track plates are suitably supported on the housing 160 of the chain and prevent the chain from sagging between the sprockets. Such a sag might cause undesirable friction between the defoliating fingers and the tobacco stalks.

It should be apparent from the foregoing description that the defoliating fingers can be mounted either as inner links or as outer links of the double chain. Conceivably, it would be possible to mount some of them as inner links and some as outer links. However, it makes for simpler construction and fewer different parts if all the defoliating fingers are made either inner links or outer links.

I claim:

1. Apparatus for harvesting tobacco leaves, including:
   a. a vehicle adapted to pass along a row of tobacco plants;
   b. a pair of defoliators mounted on said vehicle;
   wherein the improvement comprises:
   c. a front and rear defoliator guide wheels in each defoliator, spaced along the vehicle and rotatable about approximately vertical axes;
   d. a pair of opposed endless bands, one running over the guide wheels of each defoliator and adapted to move rearwardly relative to the vehicle along a defoliating reach adjacent the area between the opposed endless bands defining a stalk passageway and forwardly along a return reach spaced horizontally from said passageway;
   e. a plurality of fingers connected to each endless band and projecting toward the stalks from said defoliating reach;
   f. means driving said endless bands at a speed coordinated with the forward speed of the vehicle so that the defoliating reaches move backwardly with respect to the vehicle at substantially the same speed that the vehicle moves forwardly with respect to the ground and the fingers along the defoliating reaches do not move horizontally substantially with respect to the tobacco plants; and
   g. means on the vehicle supporting the front guide wheels at an elevation higher than the rear guide wheels, so that the fingers move downwardly of the tobacco stalks, stripping therefrom leaves between the elevations of the front and rear guide wheels.

2. Apparatus as defined in claim 1, in which said band is a chain, and means supporting each finger on a link of the chain.

3. Apparatus as defined in claim 2, including resilient means biasing each finger to a normal position with respect to its supporting link and permitting movement of the fingers away from the normal position to accommodate the engagement of the finger with a tobacco stalk.

4. Apparatus as defined in claim 2, wherein:

a. the chain comprises alternate inner and outer links, each inner link comprising a pair of end plates connected at their ends by a pair of sleeves, and each outer link comprising a pair of end plates connected at their ends by pivot pins extending through the sleeves of the adjacent inner links;

b. certain of the outer links are finger carrying links, and each said finger-carrying link comprises:
 1. further end plates including projections thereon, extending inwardly of the row of tobacco plants;
 2. a bridging member extending between the projections; and
 3. a finger on said bridging member extending toward the tobacco plants; and
 4. said bridging member extending longitudinally along the chain from the pair of plates to which it is attached and having an end portion freely slidable between the plates of the next lug-carrying link.

5. Apparatus as defined in claim 2, in which each finger is offset substantially from the center of its supporting link so as to provide substantial mechanical advantage for a tobacco stalk engaging the lug and tending to tilt the link about its pivot pins.

6. Apparatus as defined in claim 2, in which:
a. said chain comprises alternate inner and outer links;
b. said guide wheels are sprocket wheels having teeth cooperating with said links; and including:
c. means to allow radial inward movement of the finger-carrying links with respect to the sprocket wheels to relieve the stress on a tobacco stalk engaged by a finger.

7. Apparatus as defined in claim 4, in which each pair of plates of a finger-supporting link is provided with longitudinal projections on the sprocket side of the chain, extending beyond the next rearwardly adjacent outer link of the chain, said projections being engaged by said rearwardly adjacent link as it passes around the rear guide wheel, so that the finger is withdrawn quickly from the row of tobacco stalks.

8. Apparatus as defined in claim 1, in which said fingers are of yieldable material.

9. Apparatus as defined in claim 1, including gradual entrance and exit guide means for the defoliating reach of the endless band, so that the fingers are moved slowly into and away from their stalk-engaging positions.

10. Apparatus as defined in claim 6, in which said means to allow radial inward movement comprises deep recesses between certain teeth on the sprocket wheels.

11. Apparatus as defined in claim 6, in which said means to allow radial inward movement comprises:
a. at least one pair of opposed transverse slots on each finger-supporting link; and
b. pivot pin in each said pair of slots and connecting said link to the next adjacent link.

12. Apparatus as defined in claim 1, in which:
a. said endless band is a chain, including a cover therefor, and each finger is supported by a link on the chain;
b. spring means biasing each finger-carrying link toward a finger projecting position;
c. a projecting cam-following pin on each finger-carrying link; and
d. cam track means, fixed on said chain cover, along the path of movement of the chain on its defoliating reach to guide the cam-following pins to control the movement of the fingers in and out of their stalk-engaging positions.

13. Apparatus as defined in claim 1 in which:
a. said chain comprises links connected by pivot pins; and
b. star wheels pivoted on certain of said pivot pins, each said star wheel having a plurality of projecting teeth serving as stalk-engaging fingers; and
c. spring means acting on each star wheel to bias it into any of a plurality of stalk-engaging positions.

14. Apparatus as defined in claim 13, in which the teeth on the star wheel have rounded tips.

15. Apparatus as defined in claim 13 in which:

a. said spring means comprises a plurality of springs, each stretched in tension between a finger on one star wheel and a finger on the next adjacent star wheel; and
b. all said star wheels on each chain are connected by said springs.

16. Apparatus for harvesting tobacco leaves, including:
a. a vehicle having a chasses comprising:
 1. two vertically extending, horizontally spaced upright means, each adapted to pass between rows of tobacco plants; and
 2. a horizontally extending beam means connecting and supported by said vertically extending upright means adjacent the tops thereof, so that the vehicle may straddle a row of tobacco plants;
b. a pair of defoliators, one mounted on each of said vertically extending upright means, said defoliators being horizontally opposite;
wherein the improvement comprises:
c. front and rear defoliator guide wheels in each defoliator, spaced along the vehicle and rotatable about approximately vertical axes;
d. a pair of opposed endless bands, one running over the guide wheels of each defoliator and adapted to move rearwardly relative to the vehicle along a defoliating each adjacent the area between the opposed endless bands defining a stalk passageway and forwardly along a return reach spaced horizontally from said passageway;
e. a plurality of fingers connected to each endless band and projecting toward the stalks from said defoliating reach;
f. means driving said endless bands at a speed coordinated with the forward speed of the vehicle so that the defoliating reaches move backwardly with respect to the vehicle at substantially the same speed that the vehicle moves forwardly with respect to the ground and the fingers along the defoliating reaches do not move horizontally substantially with respect to the tobacco plants; and
g. means on the vehicle supporting the front guide wheels at an elevation higher than the rear guide wheels, so that the fingers move downwardly of the tobacco stalks, stripping therefrom leaves between the elevations of the front and rear guide wheels.

17. Apparatus as defined in claim 16, in which the fingers on the two endless bands are located opposite each other, so that the fingers on the two bands cooperate to form a series of frames, one of which surrounds each tobacco stalk.

18. Apparatus as defined in claim 16, in which each finger on one band is located substantially midway between two fingers on the opposite band, each finger comprising a tooth of a star wheel having a plurality of teeth, and spring detent means to bias each star wheel yieldably into one of a plurality of positions, in each of which the teeth on the star wheels on one band cooperate with the teeth on the star wheels on the other band and with the intervening parts of the bands to form a series of frames, one which surrounds each tobacco stalk.

19. Apparatus as defined in claim 16, in which said driving means includes:
a. an engine;
b. transmission means including a differential gear connecting the engine to drive wheels on opposite sides of the vehicle; and
c. means connecting said endless bands to said transmission means on the same side of said differential gear, so that the position of one band with respect to the other is not changed by operation of said differential gear.

20. Apparatus as defined in claim 16, in which:
a. one of the endless bands carries fingers whose tips trail behind the points of connection of the fingers to that band; and
b. the other of the endless bands carries fingers whose tips lead the points of connection of the fingers to that band.

21. Apparatus as defined in claim 20, in which:
a. all the fingers on said one band trail; and
b. all the fingers on the other side lead.

22. Apparatus as defined in claim 20, in which each band carries leading and lagging fingers.

23. Apparatus as defined in claim 16, including:
a. tobacco leaf removal means, comprising means defining a pair of leaf-receiving baskets located below the pair of defoliators, said baskets defining between them a central gap;
b. a plurality of parallel rollers at the bottom of each basket and adapted to receive a leaf falling thereon and drive it toward the side of the basket;
c. means to drive all the parallel rollers in one of the baskets in one direction;
d. means to drive all the parallel rollers in the other basket, except the roller nearest the central gap, in the opposite direction;
e. means to drive said roller nearest the central gap in said one direction, so that a leaf falling across the gap engages two rollers, both rotating in the same direction, and cooperating to move it in that direction.

24. Apparatus as defined in claim 1, in which:
a. each finger has an articulated connection with the band to permit deflection of the finger upon engagement with a tobacco stalk; and
b. each fingertip is offset lengthwise of the band from its articulated connection, to provide substantial mechanical advantage for a tobacco stalk acting on the fingertip and tending to deflect the finger.

25. Apparatus as defined in claim 16, including an intermediate guide wheel for one of said endless bands, said intermediate guide wheel cooperating with the front guide wheel for its associated band to define an entrance section of the defoliating reach of the band, and cooperating with the rear guide wheel to define a section of the defoliating reach parallel to the centerline of the vehicle.

26. Apparatus as defined in claim 16, including an auxiliary guide wheel cooperating with the rear guide wheel of its associated endless band to define an exit section of the defoliating reach, and cooperating with the front guide wheel of its associated band to define a section of the defoliating reach parallel to the centerline of the vehicle.

27. Apparatus as defined in claim 16, including front and rear intermediate guide wheels for each of said endless bands, said front and rear intermediate guide wheels cooperating to define opposed parallel sections of said bands; each said front intermediate guide wheel cooperating with the first-mentioned front guide wheel to define an entrance section of its associated band; each said rear guide wheel cooperating with the rear intermediate guide wheel of its associated band to define an exit section of said defoliating reach.

28. Apparatus as defined in claim 16, including:
a. a front intermediate guide wheel for one only of said bands, said front intermediate guide wheel cooperating with the first-mentioned front guide wheel of said one band to define an entrance section of the defoliating reach, said front intermediate guide wheel cooperating with the rear guide wheel for said one band to define a section of said defoliating reach parallel to the centerline of the vehicle;
b. a rear intermediate guide wheel for the other band only, said rear intermediate guide wheel cooperating with the first-mentioned rear guide wheel to define an exit section of said defoliating reach, and cooperating with the first-mentioned front guide wheel to define a section of said defoliating reach parallel to the centerline of the vehicle.

UNITED STATES PATENT OFFICE
CERTIFICATE OF CORRECTION

Patent No. 3,603,064    Dated September 7, 1971

Inventor(s) Jesse R. Pinkham

It is certified that error appears in the above-identified patent and that said Letters Patent are hereby corrected as shown below:

Col. 4, line 57, "Thereby" should read -- thereby --.

Col. 7, line 56, "triangle" should read -- triangular --.

Col. 10, line 44, delete "a" at the beginning of the line.

Col. 11, line 11, the line should read -- a bridging member....--

Col. 12, line 7, correct the spelling of "chassis";

line 25, the word "each" should read -- reach --.

Signed and sealed this 15th day of August 1972.

(SEAL)
Attest:

EDWARD M. FLETCHER, JR.        ROBERT GOTTSCHALK
Attesting Officer              Commissioner of Patents